(12) United States Patent
Kondo

(10) Patent No.: US 8,677,328 B2
(45) Date of Patent: Mar. 18, 2014

(54) GENERATING A DYNAMIC CONTENT CREATION PROGRAM

(75) Inventor: Go Kondo, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 12/167,390

(22) Filed: Jul. 3, 2008

(65) Prior Publication Data

US 2009/0019432 A1 Jan. 15, 2009

Related U.S. Application Data

(63) Continuation of application No. 11/132,887, filed on May 18, 2005, now abandoned.

(30) Foreign Application Priority Data

May 19, 2004 (JP) .................................. 2004-149186

(51) Int. Cl.
*G06F 9/45* (2006.01)
(52) U.S. Cl.
USPC .......................................... 717/140; 717/153

(58) Field of Classification Search
USPC .................................................. 717/140, 153
See application file for complete search history.

(56) References Cited

U.S. PATENT DOCUMENTS

| 7,162,687 | B2 * | 1/2007 | Pelegri-Llopart et al. ..... 715/234 |
| 7,437,669 | B1 * | 10/2008 | Blakely et al. ................ 715/264 |
| 7,634,490 | B2 * | 12/2009 | Krieg et al. ............................ 1/1 |
| 2002/0046240 | A1 * | 4/2002 | Graham et al. ............... 709/203 |
| 2002/0147887 | A1 * | 10/2002 | Copeland et al. ............. 711/118 |

\* cited by examiner

*Primary Examiner* — Li B Zhen
*Assistant Examiner* — Hang Pan
(74) *Attorney, Agent, or Firm* — Michael J. Buchenhorner; Vazken Alexanian

(57) ABSTRACT

Provides methods and apparatus that can reduce the time required for processing, when generating a dynamic content using JSP or the like. An example device for generating a dynamic content creation program internally handles text by expressing the text in a predetermined general character encoding format. The device generates a dynamic content creation program, based on a predetermined file containing static text for constituting static part of a content; and prepares in advance content character encoding format-based character code information on the static text so that the program can utilize the information.

9 Claims, 24 Drawing Sheets

```
public abstract class JSPWriterOutputStream extends javax.servlet.jsp.JSPWriter {
   private String characterEncoding;
   public JSPWriterOutputStream(int bufferSize, boolean autoFlush) {
      super(bufferSize, autoFlush);
   }
   public void setCharacterEncoding(String responseEncoding)
      this.characterEncoding = responseEncoding;
   }
   public abstract void write(byte encodedtext[]) throws java.io.IOException;
}
```

```
public void print(java.lang.String s) throws IOException {
    this.write(s.getBytes(this.characterEncoding));
}
```

FIG.6 helloworld.jsp

```
<%@ page
language="java"
contentType="text/html; charset=SHIFT_JIS"
pageEncoding="SHIFT_JIS"
%><P>こんにちは
```

```
public void _jspService(HttpServletRequest request, HttpServletResponse response)
        throws java.io.IOException, ServletException {
    JspFactory _jspxFactory = null;
    javax.servlet.jsp.PageContext pageContext = null;
    HttpSession session = null;
    ServletContext application = null;
    ServletConfig config = null;
    JspWriter out = null;
    Object page = this;
    JspWriter _jspx_out = null;

try {
        _jspxFactory = JspFactory.getDefaultFactory();
        response.setContentType("text/html; charset=SHIFT_JIS");
        pageContext = _jspxFactory.getPageContext(this, request, response,
                null, true, 8192, true);
        application = pageContext.getServletContext();
        config = pageContext.getServletConfig();
        session = pageContext.getSession();
        out = pageContext.getOut();
        _jspx_out = out;

out.write("<P>縺薙ｓ縺ｫ縺｡縺ｯ");  ← 71
    } catch (Throwable t) {
    ...
```

FIG. 7

```
((JspWriterOutputStream)out).setCharacterEncoding("Shift_JIS");
byte tmp[] = { 60, 80, 62, -126, -79, -126, -15, -126, -55, -126, -65, -126, -51 };
((JspWriterOutputStream)out).write(tmp);
```

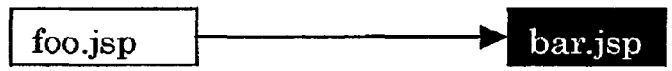

FIG.12 foo.jsp

```
<@page pageEncoding="ISO-8859-1" %>
Hello,World!
<% String includedJSPPath = ...; //PATH OF INCLUDED JSP, WHICH PATH IS DECIDED AT TIME
                                   OF EXECUTION %>
<jsp:include page="<%= includedJSPPath %>">
```

FIG.13 foo.jsp

```
<@page pageEncoding="ISO-8859-1" %>
Hello,World!
<% String includedJSPPath = ...; //PATH OF INCLUDED JSP, WHICH PATH IS DECIDED AT TIME
                                   OF EXECUTION
pageContext.include(includedJSPPath);
%>
```

FIG.14

  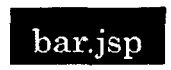

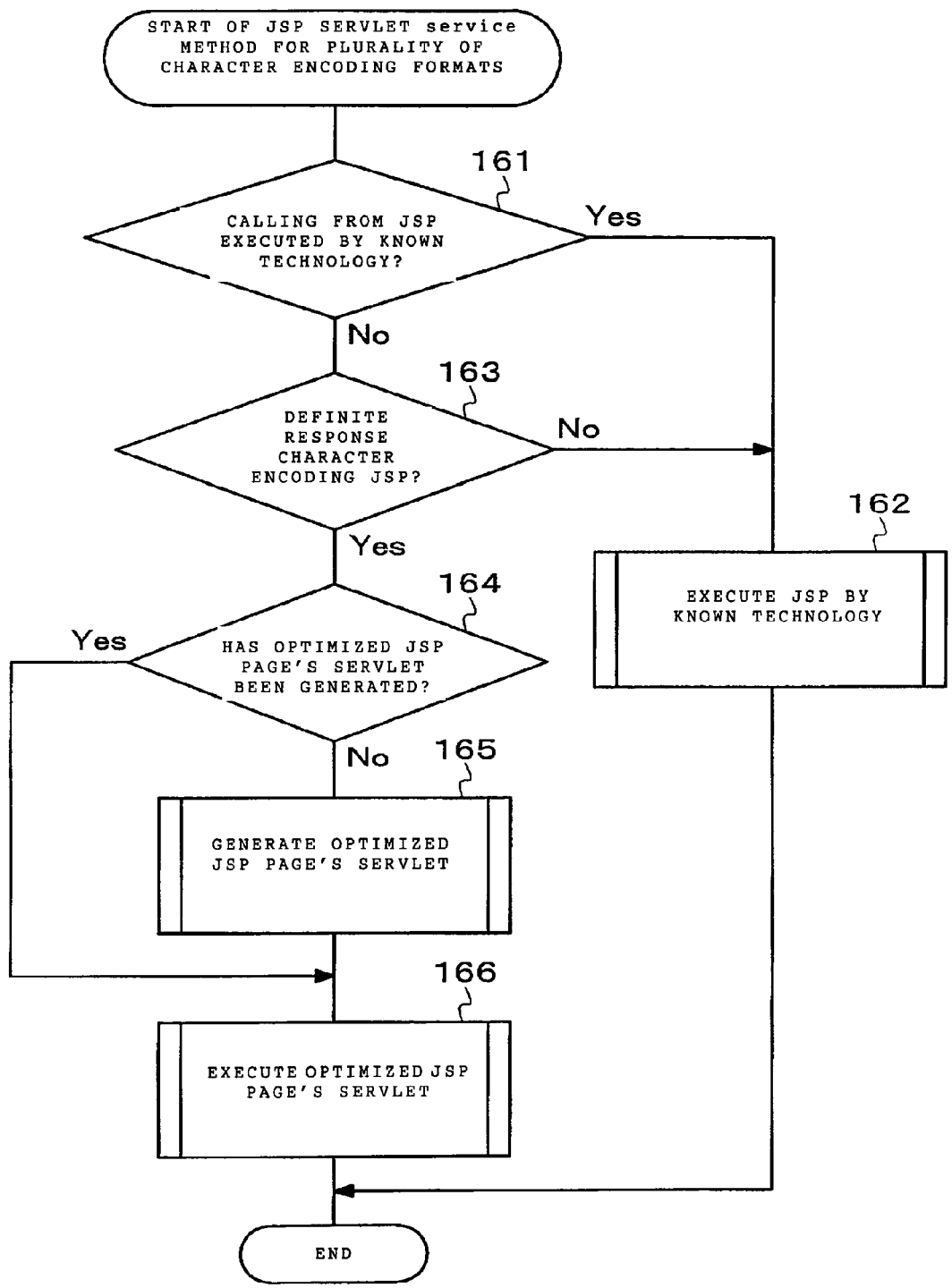

FIG.17 a.jsp

```
<%@ page
language="java"
contentType="text/html; charset=SHIFT_JIS"
pageEncoding="SHIFT_JIS"
%><P>ようこそ
<jsp:include page="c.jsp"/>
```

FIG.18 b.jsp

```
<%@ page
language="java"
contentType="text/html; charset=SHIFT_JIS"
pageEncoding="SHIFT_JIS"
%><P>ありがとうございました
<jsp:include page="c.jsp"/>
```

FIG.19 c.jsp

```
<%@ page
language="java"
contentType="text/html; charset=SHIFT_JIS"
pageEncoding="SHIFT_JIS"
%><P>ヘルプへ
```

FIG.20 a. jsp

```
<%@ page
language="java"
contentType="text/html; charset=SHIFT_JIS"
pageEncoding="SHIFT_JIS"
%><P>ようこそ
<jsp:include page="c.jsp"/>
```

FIG.21 b. jsp

```
<%@ page
language="java"
contentType="text/html; charset=EUCJP"
pageEncoding="EUCJP"
%><P>ありがとうございました
<jsp:include page="c.jsp"/>
```

FIG.22 c. jsp

```
<%@ page
language="java"
%><P>ヘルプへ
```

```
public class c_jsp extends HttpJspBase {
    private String responseCharacterEncodings[] = { "Shift_JIS", "EUCJP" };
    private int getResponseCharacterEncodingIndex(String enc) {
        for (int i = 0; i < responseCharacterEncodings.length; i++)
            if (this.responseCharacterEncodings[i].equals(enc)) return i;
        return -1;
    }
    private byte template_text_constant_pool[][][] = {
    { 60, 80, 62, -125, 119, -125, -117, -125, 118, -126, -42 }, //EXPRESSION USING SHIFT_JIS
    { 60, 80, 62, -91, -40, -91, -21, -91, -41, -92, -40 } }; // EXPRESSION USING EUCJP
    public void _jspService(HttpServletRequest request, HttpServletResponse response)
            throws java.io.IOException, ServletException {
        ...
        String responseEncoding = response.getCharacterEncoding();          ┆---251
        int responseEncodingIndex = getResponseCharacterEncodingIndex(responseEncoding);
        try {
            _jspxFactory = JspFactory.getDefaultFactory();
            pageContext = _jspxFactory.getPageContext(this, request, response,
                          null, true, 8192, true);
            application = pageContext.getServletContext();
            config = pageContext.getServletConfig();
            session = pageContext.getSession();
            out = pageContext.getOut();
            jspx_out = out;                                                              ┆---252
            ((JspWriterOutputStream)out).setCharacterEncoding(responseEncoding);
            ((JspWriterOutputStream)out).write(this.template_text_constant_pool[0][responseEncodingIndex]);
        } catch (Throwable t) {
            ...
        } finally {
            if (_jspxFactory != null) _jspxFactory.releasePageContext(pageContext);
        }
    }
}
```

FIG. 25

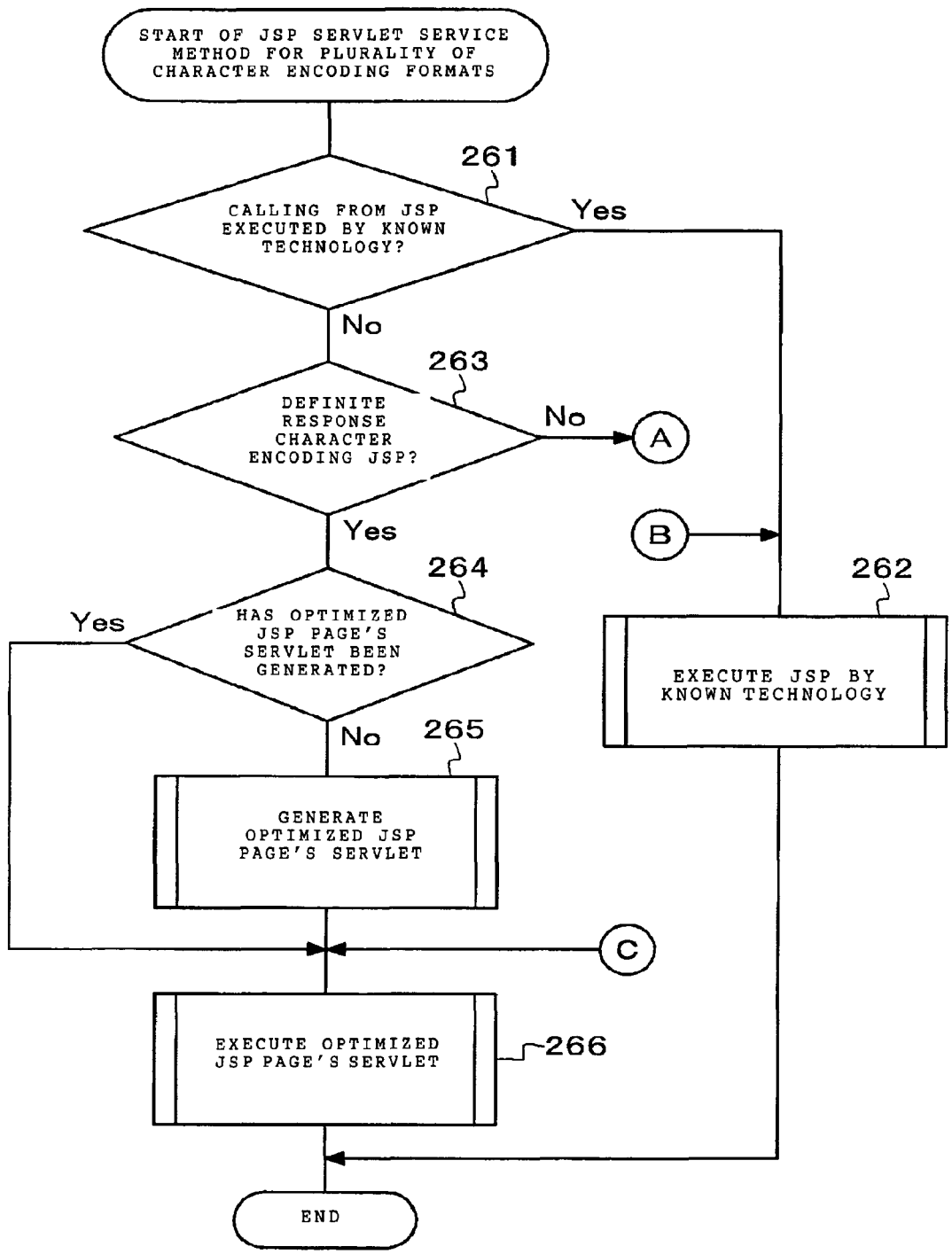

FIG.28 a.jsp CONSTANT TABLE

| TEMPLATE TEXT | Shift_JIS | EUCJP | . . . |
|---|---|---|---|
| こんにちは | 0x..,<br>0x..,<br>0x.., | 0x..,<br>0x..,<br>0x.., | |
| ようこそIBM<br>Webページへ | 0x..,<br>0x..,<br>0x.., | 0x..,<br>0x..,<br>0x.., | |
| . . . | | | |

FIG.31
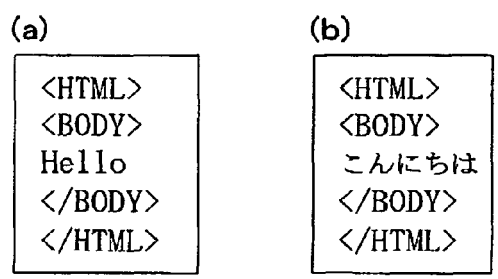
FIG.32
hello.jsp
```
<%@ taglib uri="http://jakarta.apache.org/taglibs/i18n-1.0" prefix="i18n" %>
<i18n:setLocale value=<%= request.getLocale().toString() %>/>
<i18n:bundle baseName="MyResource"/>
<HTML>
<BODY>
<i18n:message key="MSG_HELLO/>
</BODY>
</HTML>
```
FIG.33
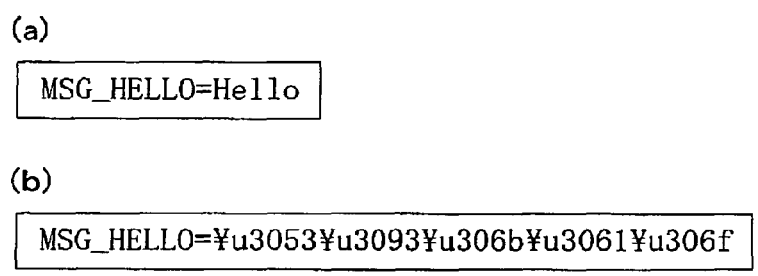

FIG.36 foo.jsp

```
<@page pageEncoding="ISO-8859-1" %>
Hello,World!
<jsp:include page="bar.jsp">
```

FIG.37 bar.jsp

```
<@page pageEncoding="Shift_JIS" %>
<% response.setCharacterEncoding("Shift_JIS"); %>
こんにちは.
```

GENERATING A DYNAMIC CONTENT CREATION PROGRAM

CROSS-REFERENCE TO RELATED APPLICATIONS

This application is a continuation of commonly-owned U.S. patent application Ser. No. 11/132,887, filed on May 18, 2005, now abandoned; which itself claims priority to Japan Patent 2004-149186 with a priority date of May 19, 2004; both of which are incorporated in their entirety as if fully set forth herein.

FIELD OF THE INVENTION

The present invention relates to a device, a program and a method, each for generating a dynamic content creation program, based on a predetermined file containing static text for constituting a static part of a content.

BACKGROUND OF THE INVENTION

A JSP is, so to speak, an HTML page in which a Java (trademark) program is embedded. The JSP is located on a Web server, whereby an HTML page in which the Java (trademark) program is expanded is provided for a client in response to a request from the client. That is, the JSP is compiled into Java (trademark) codes in a servlet format and executed when a first request has been made. Thereafter, the JSP is resident in memory in the compiled state, and is executed immediately in response to a request for the second time or later.

In the JSP, a Javax.servlet.jsp.JSPWriter object exists behind using "out" as a variable name. All outputs are transmitted to the client as HTTP responses through this object. An output is not directly written into an output stream of a Javax.servlet.http.HTTPServletResponse object. One reason for this is the need to buffer an output. That is, in the JSP, there are cases where an output already executed is canceled to perform another process. For example, when <jsp: forward page="foo.jsp"> is executed, an output before the execution of this is canceled, and control is transferred to foo.jsp. For such a case, an output needs to be stored in a buffer without being transmitted immediately.

Furthermore, JSPWriter is not a subclass of Java.io.OutputStream but a subclass of Java.io.Writer. That is, the data which JSPWriter stores in the buffer is not a byte array but a character array. The reason for storing a character array is generally that a servlet transformed and compiled from a JSP does not know what code conversion should be performed for the servlet to write into an output stream of an HTTPServletResponse object.

For example, suppose that foo.jsp as shown in FIG. 36 includes bar.jsp as shown in FIG. 37. In this case, the initial character code is ISO-8859-1 designated by foo.jsp. However, bar.jsp can change it to Shift_JIS under the JSP specifications, unless the buffer has been flushed. For the above-described reason, in a JSP, text is handled as not a byte array but a character array.

That is, in ordinary JSPs, a character code set for each language, e.g. Shift_JIS or the like in the case of Japanese, is used for any one of or both of page character encoding and response character encoding; in many of internationalization-ready JSPs, UTF8 is used for any one of or both of page character encoding and response character encoding. On the other hand, inside Java (trademark), UTF16 is used for character encoding. Accordingly, when a JSP is compiled, text in the JSP is transformed into UTF16. Consequently, when a JSP is executed, response character encoding needs to be performed for each response.

As described previously, in a Java (trademark) program in execution, characters expressed as a byte stream in the outside is transformed into a character stream to be processed. Accordingly, when a document is outputted, a character stream needs to be transformed into a character set specific to each application. This response character encoding unexpectedly takes a long time. This is a factor in reducing the speed at which a JSP is executed.

SUMMARY OF THE INVENTION

In light of the above-described problem, an object of the present invention is to provide methods, apparatus and systems which can reduce the required processing time to generate dynamic content using a JSP or the like. An example device and method for generating a dynamic content creation program according to the present invention are configured to internally handle text by expressing the text using a predetermined general character encoding format, and to create a dynamic content based on a predetermined file containing static text for constituting a static part of a content. In order to achieve the above-described object, the present invention employs a feature that character code information concerning the static text which is in a character encoding format for the content, is prepared previously so that the program can utilize the information. Further, a program according to the present invention causes a computer to function as the above-described device.

On the other hand, according to the present invention, character code information concerning the static text, which is in the character encoding format for the content, can be prepared in advance so that the program can utilize the character code information. Accordingly, the created program can output a static text part of the content by utilizing this information, without the need to perform encoding into an expression in the character encoding format for the content. Accordingly, in the case where the generated program is repeatedly executed for a predetermined period, time required for processing when the dynamic content is created can be reduced.

In an aspect of the present invention, whether the character code information can be prepared is determined for the file, and the character code information is prepared in response to an event that a positive determination is made. This positive determination is made in response to, for example, determination that the character encoding format for the content in the file is definite.

According to the present invention, a program can generate the static text part of a content without encoding the static text part into a content character encoding format, by utilizing character code information which is prepared in advance. Accordingly, in the case of repeatedly executing a generated program for a predetermined period of time, it is possible to reduce time required for processing when a dynamic content is created.

BRIEF DESCRIPTION OF THE DRAWINGS

For a more complete understanding of the present invention and the advantages thereof, reference is now made to the following description taken in conjunction with the accompanying drawings.

FIG. 4 is a view showing an API used in the method of FIG. 3.

FIG. 5 is a view showing an implementation example of a print(Java.lang.String) method which forwards a value to be printed to a write(byte[ ]) method.

FIG. 6 is a view illustrating a typical JSP having no aggregation relationship.

FIG. 7 is a view showing part of an ordinary JSP page's servlet generated from the JSP of FIG. 6.

FIG. 8 is a view showing part of an optimized JSP page's servlet generated from the JSP of FIG. 6 in accordance with the present invention, the part being different from that of the servlet of FIG. 7.

FIG. 11 is a view showing a DG created from the two JSPs of FIGS. 36 and 37.

FIG. 12 is a view showing one of two JSPs from each of which a DG as shown in FIG. 14 is created.

FIG. 13 is a view showing the other of the two JSPs from each of which a DG as shown in FIG. 14 is created.

FIG. 14 is a view showing a DG created from the JSP of FIG. 12 or 13.

FIG. 16 is a flowchart showing an execution phase of a JSP servlet adopted in a case where a Web module uses a plurality of response character encoding formats.

FIG. 17 is a view showing one of three JSPs having an aggregation relationship.

FIG. 18 is a view showing another one of the three JSPs having the aggregation relationship.

FIG. 19 is a view showing the other one of the three JSPs having the aggregation relationship.

FIG. 20 is a view showing one of three JSPs having an aggregation relationship, in which the response character encoding format changes at the time of execution.

FIG. 21 is a view showing another one of the three JSPs having the aggregation relationship, in which the response character encoding format changes at the time of execution.

FIG. 22 is a view showing the other one of the three JSPs having the aggregation relationship, in which the response character encoding format changes at the time of execution.

FIG. 25 is a view showing one example of a servlet which can generate a response in both the case where c.jsp. of FIG. 22 is called by a.jsp of FIG. 20 and the case where c.jsp is called by b.jsp of FIG. 21.

FIG. 26 is a flowchart showing another embodiment of a process for executing a JSP servlet for a plurality of response character encoding formats in the process of FIG. 9.

FIG. 28 is a view showing an appropriate table as a constant table which is created or updated in the process of FIG. 27 and which is used by an optimized JSP page's servlet created in the process of FIG. 27.

FIGS. 31A and 31B are views illustrating HTML documents which have the same effect but of which display languages are respectively English and Japanese.

FIG. 32 is a view showing a JSP which generates two HTML documents of FIGS. 31A and 31B using JSTL internationalization tags.

FIGS. 33A and 33B are views showing language resources necessary to generate the two HTML documents of FIGS. 31A and 31B from the same JSP using JSTL internationalization tags.

FIGS. 35A and 35B are views showing JSPs localized by the existing technology of FIG. 34 based on the internationalized JSP of FIG. 32.

FIG. 36 is a view illustrating a JSP including the JSP of FIG. 37.

FIG. 37 is a view illustrating the JSP included by the JSP of FIG. 36.

DETAILED DESCRIPTION OF THE INVENTION

Figure 1:
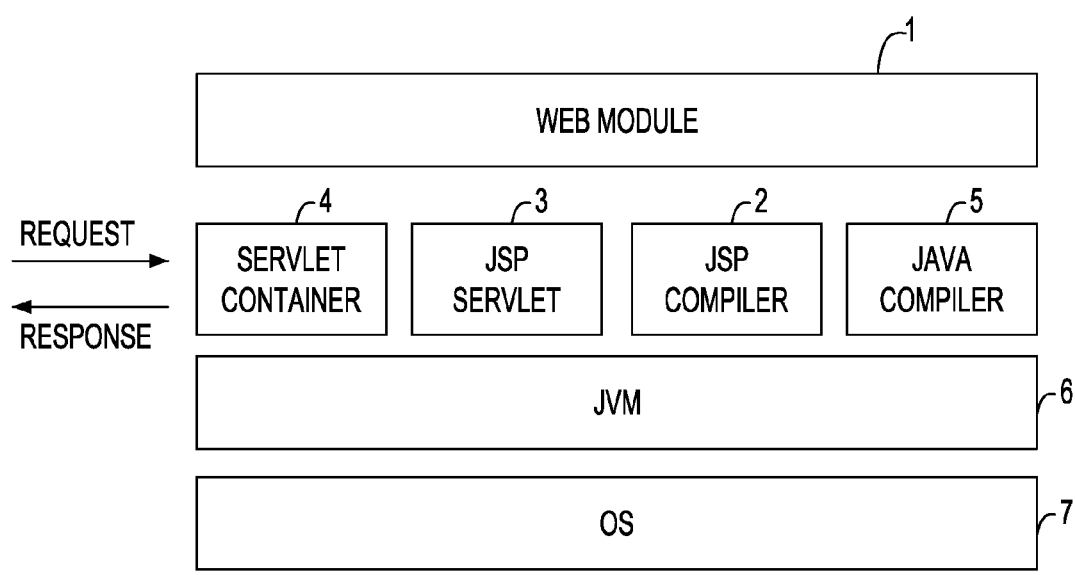
FIG. 1 is a diagram showing a system configuration of a dynamic content generation device using a dynamic content creation program generation device according to one embodiment of the present invention.

An object of the present invention is to provide methods, systems and apparatus that can reduce the time required for processing when a dynamic content is generated using a JSP or the like. Example devices and methods for generating a dynamic content creation program according to the present invention are configured to internally handle text by expressing the text using a predetermined general character encoding format and to create a dynamic content based on a predetermined file containing static text for constituting a static part of a content. The present invention has a feature that character code information concerning the static text which is in a character encoding format for the content, is prepared in advance so that the program can utilize the information. Further, a program according to the present invention causes a computer to function as the above-described device.

Here, the dynamic content creation program is, for example, a JavaServer Pages (JSP) compiler. The dynamic content is, for example, a dynamic Web content described in HTML or XML. The predetermined file is, for example, a JSP file. The predetermined general character encoding format is, for example, UTF-16. The character encoding format for the content is, for example, ISO-8859-1, UTF-8, or Shift_JIS.

In this configuration, when the program is generated from the file, text is handled by expressing the text using the predetermined general character encoding format in an internal process except input and output. Accordingly, the following has been heretofore adopted: when the program is generated, the static text of the file is decoded into an expression in the general character encoding format, the part of the program which outputs the static text is created using this expression, and, when the dynamic content is generated by executing the program, an expression of the static text in the general character encoding format is encoded into an expression in the character encoding format for the content. Accordingly, in the case where the generated program is repeatedly executed after the program has been generated, the encoding is performed for each execution.

On the other hand, according to the present invention, the character code information concerning the static text, which is in the character encoding format for the content, can be prepared in advance so that the program can utilize the character code information. Accordingly, the created program can output a static text part of the content by utilizing this information, without the need to perform encoding into an expression in the character encoding format for the content. Accordingly, in the case where the generated program is repeatedly executed for a predetermined period, time required for processing when the dynamic content is created can be reduced.

Incidentally, the character code information can be prepared by encoding the static text decoded into an expression in the general character encoding format into an expression in the character encoding format for the content. Further, the character code information can also be prepared by directly using the static text in the file without any transform, on condition that the encoding format concerning the static text in the file is identical to that in the content.

In a preferable aspect of the present invention, whether the character code information can be prepared is determined for the file, and the character code information is prepared in response to an event that a positive determination is made. This positive determination is made in response to, for example, determination that the character encoding format for the content in the file is definite.

A positive determination is also made for a plurality of files having an aggregation relationship, on condition that, in the case where the plurality of files are classified into a first type, which does not contain an instruction to change the character encoding format for the content, and the rest, all the plurality of files having the aggregation relationship belong to the first type and the character encoding formats for the contents are identical for all the files.

Even in the case where this positive determination has not been made, if a graph showing the aggregation relationship is created using, as a clause, each of the plurality of files having the aggregation relationship, and connected components in the graph are found, then a positive determination can be made for each file belonging to, among the connected components, a connected component in which all the files belong to the first type and in which the character encoding formats for the contents are identical in a case where all the files are regarded as a single file. However, this positive determination is made on condition that the relevant file is not called by the file for which the positive determination has not been made.

Further, means for preparing in advance the character code information may take into account an execution context of each of the respective programs generated from the plurality of files having an aggregation relationship, and may prepare the character code information concerning the static text for each character encoding format for the content, which has a possibility of being adopted at time of execution, for the program in which the character encoding format that is adopted for the content changes depending on the execution context.

For example, as the means for preparing in advance the character code information, used is means including: means for classifying the plurality of files having an aggregation relationship into a first type which does not contain an instruction to change the character encoding format for the content, a second type which contains an instruction to change the character encoding format for the content to a definite one, and a third type other than the first and second types; means for making a determination as to whether each of the plurality of files having the aggregation relationship is a definite file in which the character encoding format for the content can be uniquely decided; and means for making a determination for each of the plurality of files having the aggregation relationship as to whether the character code information for the content concerning the static text of the relevant file is generated by encoding an expression of the static text in the general character encoding format into an expression in the character encoding format for the content at time of execution of the program generated from the relevant file.

Further, among the plurality of files having the aggregation relationship, for the file except intersection of the definite file and the file called by the file which requires encoding at the time of the execution, an execution context tree in which an unaggregated file is a root is acquired; for the tree in which all the files belong to the first type or the tree in which the program based on the file of the root performs buffering in relation to output for generating the content, the character encoding format for the content concerning the file of the root is adopted for all the files belonging to the relevant tree; and, for the file for which the foregoing adoption has been performed, the character code information concerning the static text of the relevant file, which is in the adopted character encoding format for the content, is prepared in advance so that the program generated from the relevant file can utilize the information.

Alternatively, among the plurality of files having the aggregation relationship, for the file except intersection of the definite file and the file called by the file which requires encoding at the time of the execution, an execution context tree in which the unaggregated file is a root is acquired; among the trees, for the tree satisfying conditions that the tree is not a tree in which all the files belong to the first type, the tree is a tree in which the program based on the file of the root performs buffering of finite size in relation to output for generating the content and throws an exception when a buffer has been filled, and the tree is a tree in which, after the file called by the file of the third type has been removed, the latest and deepest file belongs to the second type, the character encoding format for the content of the latest and deepest file is adopted for all the files belonging to the relevant tree; and, for the file for which the foregoing adoption has been performed, the character code information concerning the static text of the relevant file, which is in the adopted character encoding format for the content, is prepared in advance so that the program generated from the relevant file can utilize the information.

The present invention can be applied to a file, on condition that the file contains an international code which is defined as one having a common meaning in a plurality of predetermined languages and for which respective character codes of the plurality of languages corresponding to the international code are prepared as a resource, by transforming the relevant file into a format in which the international code is expressed by the static text, based on the resource and the language designated among the plurality of languages.

Incidentally, for the file for which the character code information cannot be prepared, the program is generated so that the character code information is created by encoding an expression of the static text in the general character encoding format into an expression in the character encoding format for the content at time of execution of the program generated from the relevant file, as heretofore.

According to the present invention, a program can generate a static text part of a content without encoding the static text part into a content character encoding format, by utilizing character code information which is prepared in advance. Accordingly, in the case of repeatedly executing a generated program for a predetermined period of time, it is possible to reduce time required for processing when a dynamic content is created.

For example, in the case of JSP, processing of encoding into an expression in a response-character encoding format is additionally required in comparison with a case of directly writing into an output stream of a response by means of a Servlet. However, assuming that the percentage of the encoding processing to the whole processing is 10% and that the percentage of template text to an output document is 90%, an about 9% improvement in execution speed can be expected according to the present invention. In addition, it is not necessary at all to change an application in order to apply the present invention.

FIG. 1 shows a system configuration of a dynamic content generation device using a dynamic content creation program generation device according to one embodiment of the present invention. This system includes a Web module 1 including a JSP, a servlet, and the like, a JSP compiler 2 for generating a JSP page's servlet from a JSP, a JSP servlet 3 for starting a JSP page's servlet, a servlet container 4 for starting the JSP servlet 3 in response to a request from a client, and a Java (trademark) compiler 5 for compiling the source code of a servlet into byte codes. The byte codes are executed by a Java (trademark) virtual machine 6. The Java (trademark) virtual machine 6 ensures the operation of a Java (trademark) program independent of an OS 7.

Figure 2:
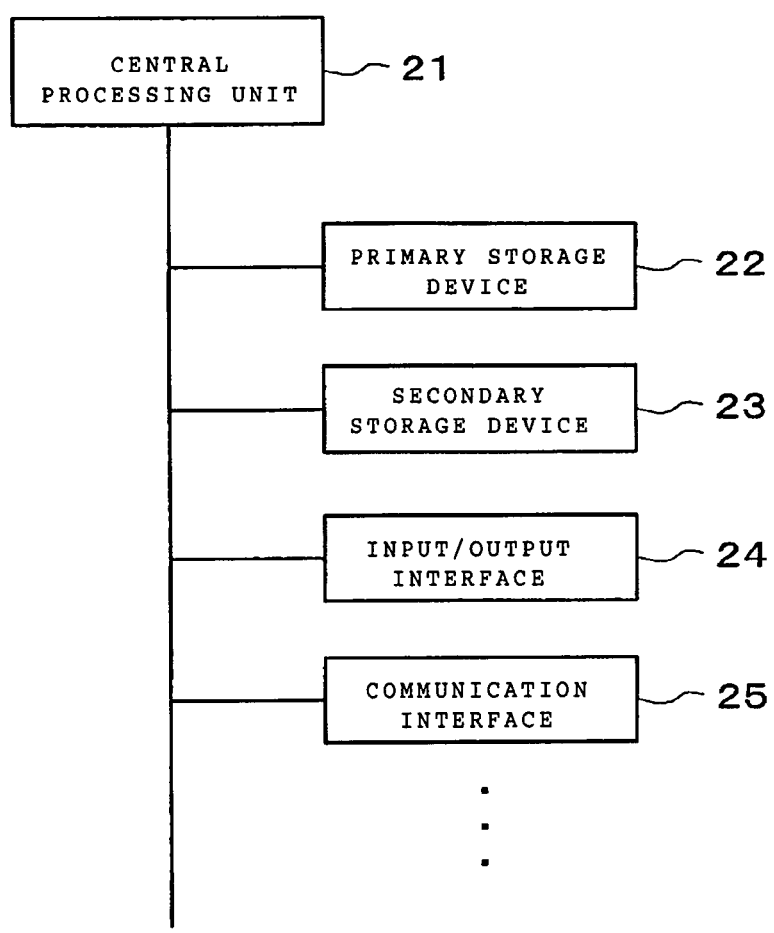
FIG. 2 is a block diagram showing a hardware configuration of a computer on which the system shown in FIG. 1 can operate.

FIG. 2 shows a hardware configuration of a computer on which the system shown in FIG. 1 can operate. This computer includes a central processing unit 21 for processing data based on a program and for controlling each unit, a primary storage device 22 for storing a program in execution and related data so that the central processing unit 21 can access the program and the data at high speed, a secondary storage device 23 for storing programs and data, an input/output interface 24 for connecting with input and output devices, a communication interface 25 for connecting with an external communication line, and the like. Pieces of software and databases constituting the processing system 1 in FIG. 1 are installed on the secondary storage device 23.

Upon receiving a request from a client, the servlet container 4 starts the JSP servlet 3. The JSP servlet 3 starts a JSP page's servlet generated from a JSP. A dynamic content is generated by executing the JSP page's servlet. The generated dynamic content is transmitted to the client through the servlet container 4.

The part of the JSP which generates an unchangeable part of the above-described content generated by executing the JSP, except for the part of the content that changes dynamically, is called template text. In terms of the number of characters, template text accounts for the major part of an outputted document in HTML or the like. Accordingly, in the present embodiment, a processing speed is improved by omitting a code conversion of template text. Incidentally, for an object or an immediate value which is referenced by the JSP as a result of application logic at the time of execution, if the object or immediate value is referenced many times, it is conceivable that a code conversion is performed only for the first time and omitted for the second time or later. However, this is expected to constitute a small contribution to the improvement in the overall efficiency and therefore is not performed.

Hereinafter, a servlet generated from a JSP is referred to as a "JSP page's servlet." Further, a servlet which generates a JSP page's servlet in the actual servlet container 4 and which forwards a request from a client to the JSP page's servlet, is referred to as a "JSP servlet." A JSP page's servlet generated and executed by a known technology is referred to as an "ordinary JSP page's servlet." A JSP page's servlet which is generated and executed according to the present invention and in which response character encoding is omitted is referred to as an "optimized JSP page's servlet."

In the present embodiment, an optimized JSP page's servlet is generated from a JSP which does not involve "include" and the like and which is executed as a unit. First, a response character encoding format to be used by the JSP is determined. What to use as this encoding format is defined by JSP specifications. For example, in the case of JSP 2.0, the encoding format defined in the fourth chapter of the specifications is used. At the same time, the page character encoding format used for the encoding of the JSP itself is determined. This determination can be performed in accordance with an algorithm defined in JSP specifications. Hereinafter, the former encoding is referred to as "responseEncoding," and the latter is referred to as "pageEncoding."

Figure 3:
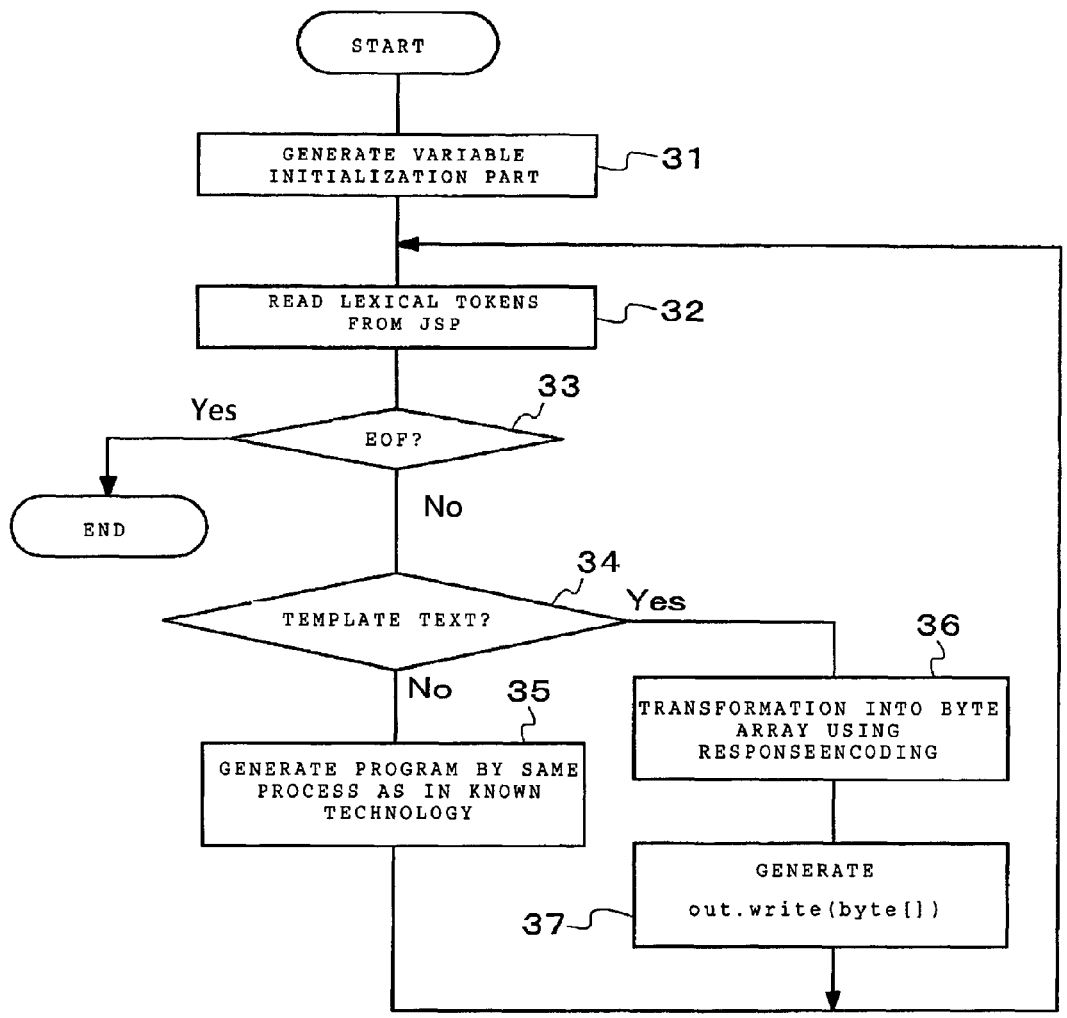
FIG. 3 is a flowchart showing an algorithm for generating a _jspService method when an optimized JSP servlet is generated from a JSP servlet in the configuration of FIG. 1.

Next, an optimized JSP servlet is actually generated from the JSP servlet. At that time, a part which generates a _jspService method is different from that of a known technology. FIG. 3 shows an algorithm for generating this _jspService method. First, not JSPWriter but a Writer instance which can print a byte array is set to be assigned to a local variable "out" of this method (step 31). This class is temporarily referred to as JSPWriterOutputStream. This JSPWriterOutputStream class becomes, for example, the API shown in FIG. 4. In this API, after this class is instantiated, a variable responseEncoding determined first is given to a property characterEncoding for managing response character encoding.

Next, lexical tokens are read from the JSP (step 32). If the read lexical tokens are not template text, compilation is performed as in the case of an ordinary JSP page's servlet (steps 34 and 35). Incidentally, the JSPWriterOutputStream object indicated by the variable "out" is of the type JSPWriter. Accordingly, for a JSP in which an error does not occur in compilation by a known JSP processor, a compilation error does not also occur in the case of a JSP processor according to the present invention.

On the other hand, if the read lexical tokens are template text, a byte array is created based on the text (steps 34 and 36). This creation can be performed by any one of the following methods. The first method is a method applicable to the case where a JSP parser has transformed a character string in the JSP into a character type using pageEncoding. That is, the template text cut out as a String object or the like is inversely transformed into a byte array using the pageEncoding. The second method is a method which can be used only in the case where pageEncoding and responseEncoding are identical. A region corresponding to the template text in the JSP is cut out as a byte array as being of a byte type without being transformed into a character type.

Next, the created byte array is passed to an argument of a write(byte[ ]) method of a JSPWriterOutputStream instance indicated by the variable "out" to be outputted (step 37).

The process of steps 32 to 37 is repeated until the end of the file (EOF) is read (step 33). Thus, the generation of a _jspService method is completed.

In the above description, only an API as an abstract class JSPWriterOutputStream has been described. Next, how a concrete class actually operates will be described. First, each of various "print" methods which is an abstract method in a base class JSPWriter and which is called by a part other than the template text, encodes a value to be printed which is given by an argument, using characterEncoding, to convert the value into a byte array, and forwards the byte array to a write(byte[ ]) method. For example, an implementation of a print(Java.lang.String) method becomes a simple one as shown in FIG. 5.

Moreover, in accordance with JSP specifications, the write (byte[ ]) method is configured so that the byte array of the argument is directly written into OutputStream obtained from a getOutputStream( ) method of an HttpServletResponse object in the case where an output is not buffered.

On the other hand, in the case where an output is buffered, the output is held in a buffer as being of a byte type, not a character type. When the buffer size is exceeded, if an autoFlush attribute is true, data in the buffer is similarly written into OutputStream obtained from the getOutputStream( ) method of the HttpServletResponse object. If the autoFlush attribute is false, IOException is thrown similarly to the operation for the case of the base class.

Next, as a specific example, a situation in which a typical JSP having no aggregation relationship as a program (servlet) on a server is actually executed will be described. FIG. 6 shows a JSP which is called helloworld.jsp and which is to be executed. The page character encoding format and response character encoding format of this JSP are Shift-JIS. Using Tomcat as a reference implementation of JSP, and using Jasper which is a JSP compiler contained in Tomcat, a helloworld_jsp class of an ordinary JSP page's servlet containing a _jspService method as shown in FIG. 7 can be generated from the helloworld.jsp. Incidentally, the argument of a write statement 71 in the drawing becomes garbled. However, this is caused by the encoding of the source code of the helloworld_jsp class, and there is no problem in practical use.

In this method, the argument of the write statement 71 is a String object. When Jspwriter indicated by "out" is flushed, response character encoding must be performed. Accordingly, in an optimized JSP page's servlet according to the present invention, the write statement 71 is transformed as shown in FIG. 8. Here, JspWriterOutputStream to which the "out" variable is cast is a class which can output the aforementioned byte array. Further, an argument of the write (byte[ ]) method, which is represented by a local variable "tmp" in this example, is a byte string for the case where a line of text indicating "<p> konnichiha (in Japanese)" in the original JSP is encoded into Shift-JIS. Use of this method for outputting a byte array eliminates the necessity to perform response character encoding on template text every time each response is generated.

In the above-described embodiment, the case where the response character encoding format of a JSP has been determined has been described. However, in a complicated case where a JSP is not singly executed but aggregated and where JSPs use different response character encoding formats, a determination as to a response character encoding format is not obvious. Aggregation relationships between JSPs are represented by JSP tags including <jsp:include>, <jsp:doBody>, <jsp:invoke>, and the like, and method callings including Java (trademark) x.servlet.jsp.PageContext#include and the like. Next, an embodiment in which a response character encoding format to be used by an actual JSP servlet is derived even in such a general case, will be described.

Figure 9:
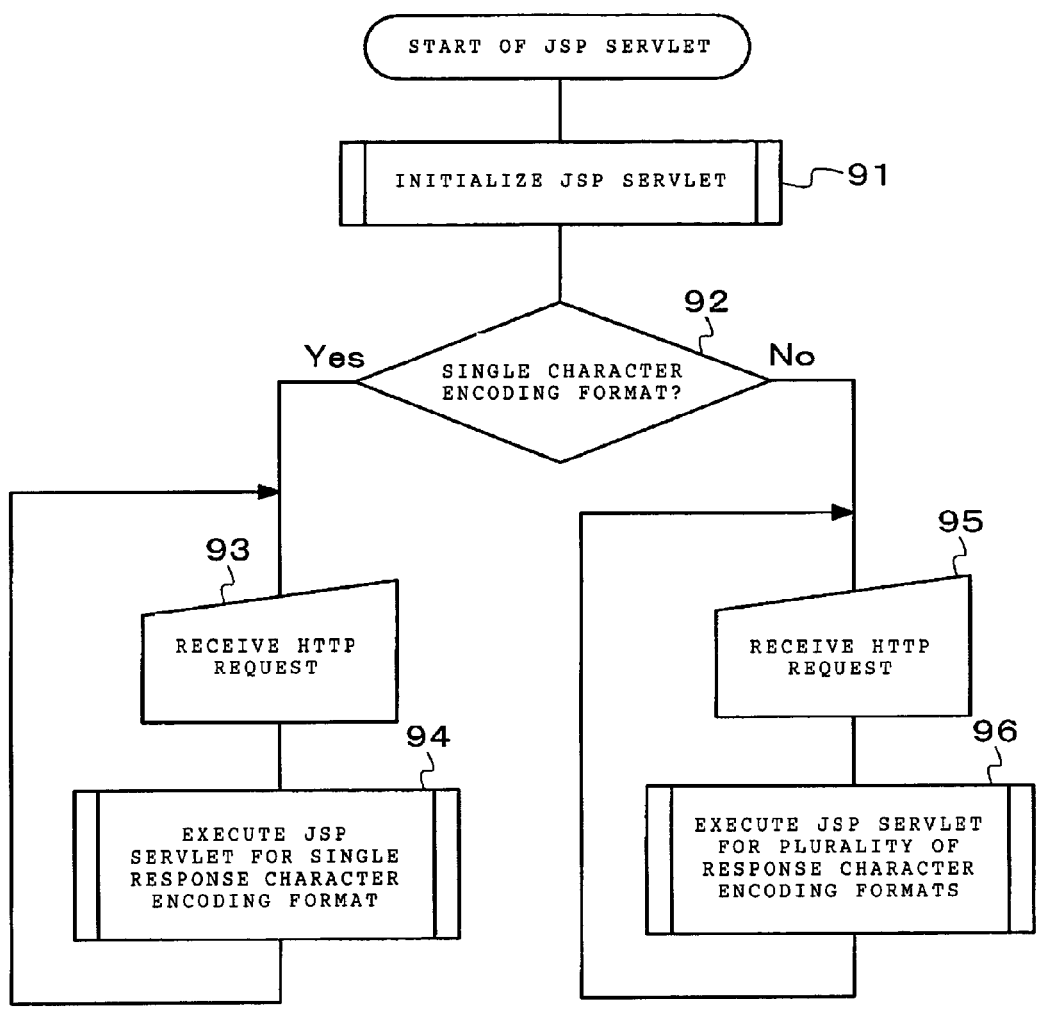
FIG. 9 is a flowchart showing an execution cycle of a JSP servlet according to another embodiment of the present invention.

FIG. 9 shows an execution cycle of a JSP servlet according to another embodiment of the present invention. That is, first, the JSP servlet is initialized (step 91). If a single response character encoding format exists (step 92), the execution of a JSP servlet for a single response character encoding format is repeated (step 94) every time an HTTP request is received (step 93). On the other hand, if a plurality of response character encoding formats exist, the execution of a JSP servlet for a plurality of response character encoding formats is repeated (step 96) every time an HTTP request is received (step 95).

Figure 10:
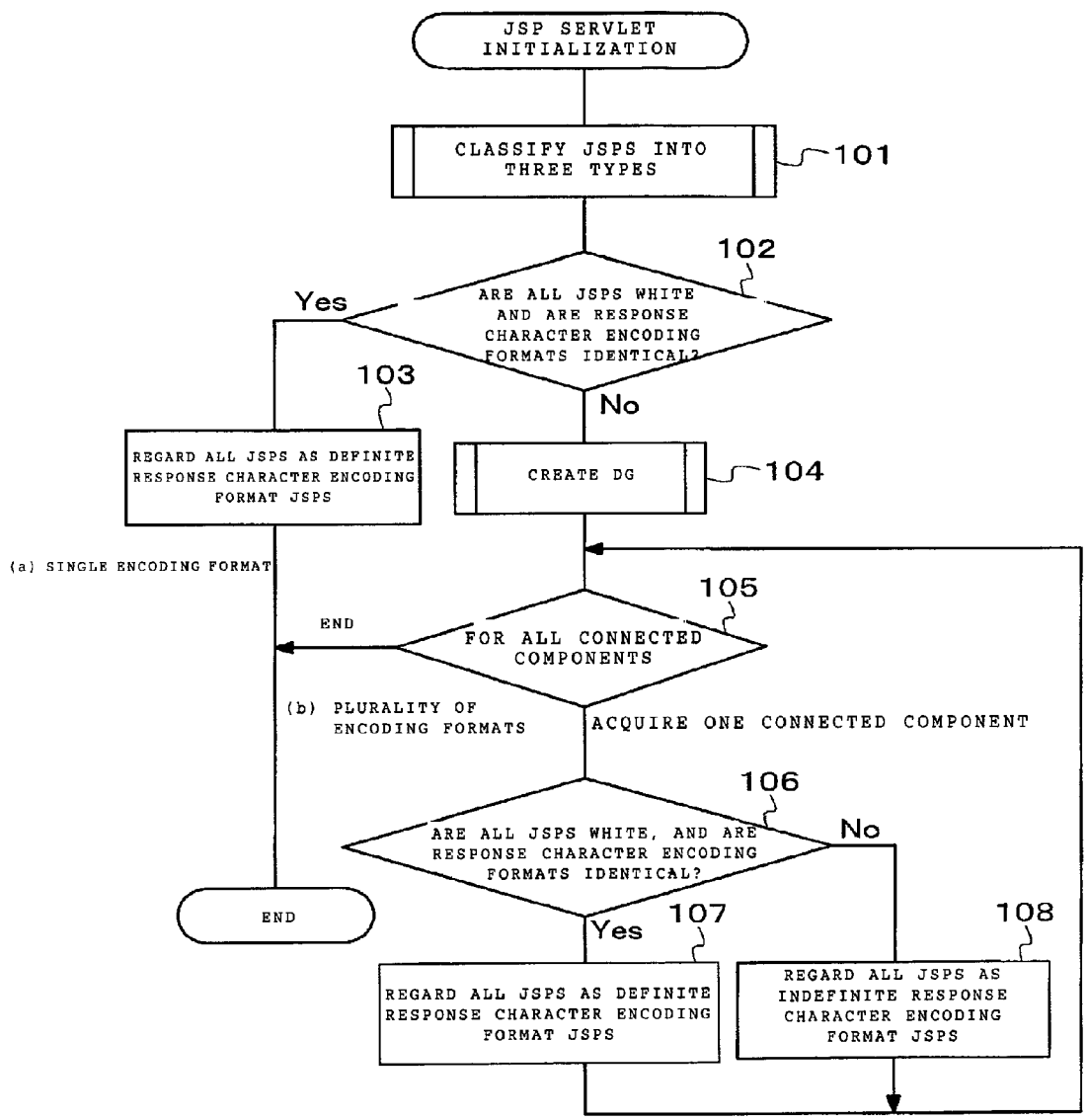
FIG. 10 is a flowchart showing a process in an initialization phase of the flowchart of FIG. 9.

FIG. 10 shows the process of the above-described initialization phase (step 91). First, in step 101, all JSPs in an application are classified into three types. Here, for convenience of explanation, classification is performed by color coding using three colors of black, gray, and white. However, classification into three types is for convenience of explanation of a further improved embodiment which will be described later. Accordingly, in the present embodiment, it is also possible to adopt classification into two types using, instead of gray and black, non-white including all other than white.

Black means a JSP containing an instruction to change the response character encoding format, such as bar.jsp in FIG. 37. However, a contentType attribute of a page directive is not included in such an instruction because the initial value of a response character encoding format can beset but cannot be changed by the attribute. For example, <%@ page contentType="text/html; charset=Shift_JIS"%> can set the initial value of a response character encoding format to Shift_JIS, but cannot overwrite and change an already defined value. Accordingly, a JSP containing only this directive is not black. In the specifications of JSP 2.0, instructions to change a response character encoding format include Javax.servlet.HttpServletResponse#setCharacterEncoding (Java. lang.String) and Javax.servlet.HttpServletResponse#setLocale (Java.util.Lcale).

Gray means a JSP which contains an instruction to change a response character encoding format and which calls the instruction using an "if" statement or a "while" statement only in the case where a certain condition is satisfied. A JSP in which an argument of the above-described setCharacterEncoding or setLocale method cannot be determined through static analysis, is also classified into gray. However, a JSP in which, after the calling of such an indefinite method, the response character encoding format is overwritten by a calling of a definite method, is classified into black.

White means a JSP not containing an instruction to change a response character encoding format.

In this classification using color coding, in order to detect an instruction to change a response character encoding format, it is not enough to simply search a JSP file for the calling of such a method by character string matching. The detection of an instruction to change a response character encoding format is, of course, performed using Java (trademark) program analysis technology. If there is a part on which program analysis cannot be performed, i.e. a part or the like in which reflection is used, the relevant JSP is conservatively classified into gray (may be classified into non-white in the case of classification into two types). This program analysis needs to be performed not only on JSPs but also on classes referenced directly or referenced through Taglib or the like.

Next, the process goes to step 102, and a determination is made as to whether all JSPs in a Web module are white and the response character encoding formats thereof are identical. If the determination result is positive, this case boils down to an issue for the case where these JSPs are regarded as a single JSP. That is, all JSPs are regarded as definite response character encoding JSPs in which the response character encoding is definite (step 103). Further, since the response character encoding formats of all JSPs are identical, it is decided to refer to such a Web module as a single response character encoding Web module.

If the respective response character encoding formats of the JSPs in the Web module are not identical, a graph showing aggregation relationships is created using, as a clause, each JSP classified using color coding in order to make a determination as to the possibility of using an identical response character encoding format for JSPs having aggregation relationships (step 104). Since an aggregation relationship involves an aggregating side and an aggregated side, a directed graph which holds the relationship is created. It is decided to refer to this graph as DG. At that time, the DG may be created with an attribute of order attached to each of all directed edges which appear from one JSP as in the case of the improved embodiment to be described later, though not indispensable. Order means the order in which JSPs are aggregated. In other words, an aggregation action located in an earlier part of a JSP file forms a higher order edge. In a DG created as described above, there should be no cycle in the case of a Web application which operates correctly.

In order to create directed edges of the DG, it is necessary to detect aggregation actions from the JSPs. In order to perform this, similar to the case of the aforementioned detection of an instruction to change a response character encoding format, character string matching is not enough, and program analysis needs to be performed. At that time, there may be cases where an aggregation action cannot be analyzed, or where an aggregation action can be detected but an argument which is the destination of a directed edge is a variable, though such cases are very rare. A directed edge is not created from such an aggregation action, but the relevant JSP is changed to gray (may be changed to non-white in the case of classification into two types).

For example, a DG created from the two JSPs shown in FIGS. 36 and 37 is a simple one as shown in FIG. 11. "foo.jsp" is classified into white, and "bar.jsp" is classified into black. "bar.jsp" is aggregated into "foo.jsp." Further, in the case where this foo.jsp is as shown in FIG. 12 or 13, the path to a JSP, through which aggregation is made, is undetermined. Accordingly, the DG becomes as in FIG. 14. A directed edge is not created, and foo.jsp is classified into gray.

After a DG has been completed, what is called a connected component in graph theory is searched (step 105). Then, a determination is made as to whether all JSPs in the connected component are white and response character encoding formats are identical in the case where all the JSPs are regarded as a single JSP (step 106). That is, after ruling out the possibility that the response character encoding format can be changed depending on an aggregating JSP or an aggregated JSP, a determination is made as to whether the response character encoding format can be uniquely decided. In a set of JSPs which satisfy these conditions, the response character encoding format is definite. Accordingly, these JSPs are regarded as definite response character encoding JSPs (step 107). On the other hand, a set of JSPs which do not satisfy the above-described conditions are regarded as indefinite response character encoding JSPs (step 108). When the process of steps 106 to 108 has been completed for all connected components, it is determined that the Web module requires a plurality of character encoding formats, and the initialization process is ended.

Thus, in the initialization phase, a discrimination can be made between (a) the case where all JSPs use a single response character encoding format and (b) the other case, i.e. the case where a plurality of response character encoding formats are used. Further, in the case (b), all the JSPs in the Web module can be classified into definite response character encoding JSPs and indefinite response character encoding JSPs.

Figure 15:
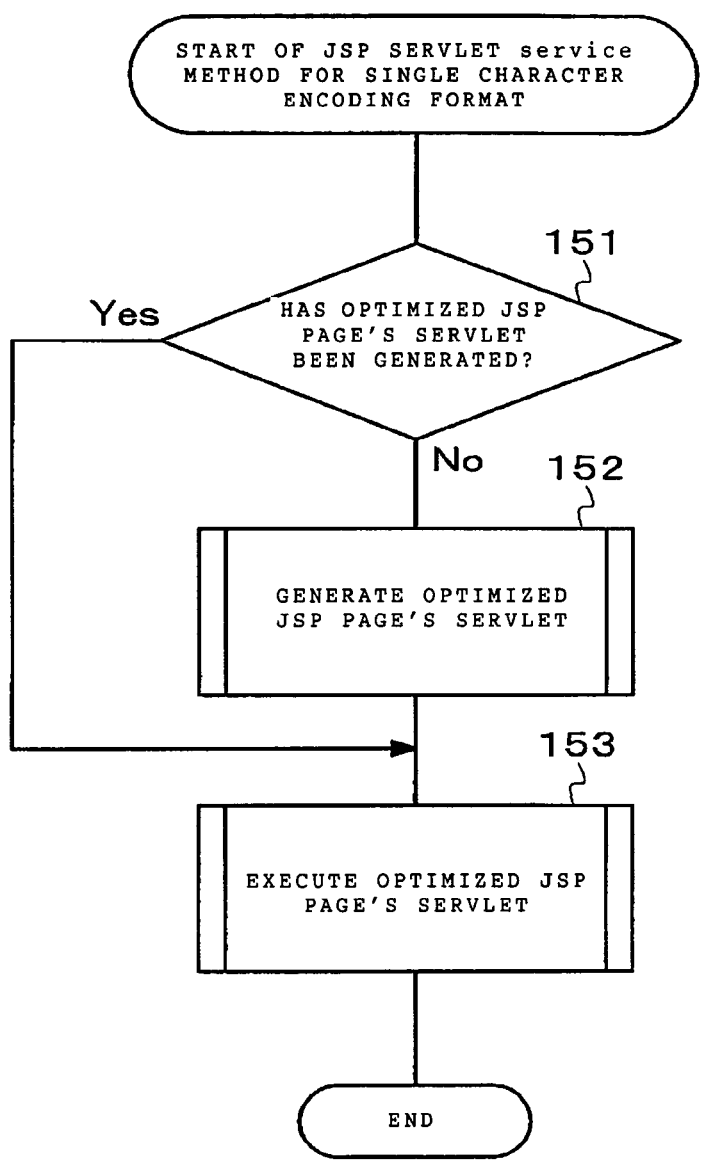
FIG. 15 is a flowchart showing an execution phase of a JSP servlet adopted in a case where all JSPs in a Web module use a single response character encoding.

FIG. 15 shows an execution phase (step 94 in FIG. 9) of a JSP servlet applied to the above-described case (a). First, a determination is made as to whether an optimized JSP page's servlet has been generated (step 151). In the case where it is determined that an optimized JSP page's servlet has not been generated, an optimized JSP page's servlet is generated (step 152) and executed (step 153). If it is determined that an optimized JSP page's servlet has been generated, the generated optimized JSP page's servlet is executed (step 153). This servlet execution phase differs from the execution phase of a JSP servlet in step 96 of FIG. 9 in the procedure for generating a _jspService method in the process (step 152) for generating an optimized JSP page's servlet. The procedure is as shown in FIG. 3.

FIG. 16 shows an execution phase (step 96 in FIG. 9) of a JSP servlet applied to the aforementioned case (b). First, a determination is made as to whether a JSP to be executed is aggregated from a JSP executed by a known technology (step 161). This determination is true in the case where the JSP to be executed is recursively called in a process for executing a JSP by a known technology in step 162 which will be described later. This determination can be made by, for example, giving an omitEncoding attribute to a request object, using the omitEncoding attribute as a flag, and checking whether the omitEncoding attribute is false.

If the result of this determination is true, an omission of character encoding according to the present invention cannot be adopted, and a JSP is therefore executed by a known method (step 162). That is, if an ordinary JSP page's servlet has not been generated, an ordinary JSP page's servlet is generated and executed, and, if an ordinary JSP page's servlet has been generated, the generated ordinary JSP page's servlet is executed. Note that, in the process of this step 162, a flag for making a determination in the aforementioned step 161 as to whether a JSP aggregated into the JSP in execution is executed by a known technology or by adopting an omission of character encoding according to the present invention, is set. For example, the omitEncoding attribute of the request object is set to false.

If the determination result of step 161 is negative, a determination is made as to whether the JSP to be executed is a definite response character encoding JSP which has been decided in the initialization phase in the aforementioned FIG. 10 (step 163). If the determination result is negative, the JSP is executed by a known method (step 162). If the determination result is positive, a determination is made as to whether the generation of an optimized JSP page's servlet in step 165 has already been performed (step 164). If the generation has been already performed, the generated optimized JSP page's servlet is executed (step 166). If the generation has not been performed, the relevant JSP is compiled into an optimized JSP page's servlet by the same method as that of step 152 in FIG. 15 (step 165) and executed (step 166).

Here, even the same JSP has the possibilities of passing through different paths, which are the path of step 162 and the path of steps 165 and 166. JSP page's servlets generated and executed in these paths are different servlets, which are an ordinary JSP page's servlet and an optimized JSP page's servlet, respectively. Accordingly, using different class names, caution must be taken to prevent one from breaking the other by overwriting and to prevent execution from being incorrectly performed.

Next, an explanation will be made using a specific example. For example, when a determination is made as to whether the JSPs a.jsp, b.jsp, and c.jsp which are respectively shown in FIGS. 17 to 19 and which have aggregation relationships are definite response character encoding JSPs (steps 101 and 102 in FIG. 10), all of these three JSPs are white, and it is determined that the response character encoding formats thereof are Shift_JIS only. Accordingly, these JSPs can be executed similarly to the case where a single JSP is executed as in the aforementioned embodiment (step 94 in FIG. 9).

Incidentally, in existing Web applications, there many single response character encoding Web modules. In other Web modules, the proportion of definite response character encoding JSPs is also considerably large. Accordingly, for single response character encoding Web modules and definite response character encoding JSPs alone, the applicable scope of the present invention is considered to be wide. However, furthermore, there are cases where efficiency can be further improved even for other JSPs according to the following embodiment.

Figure 27:
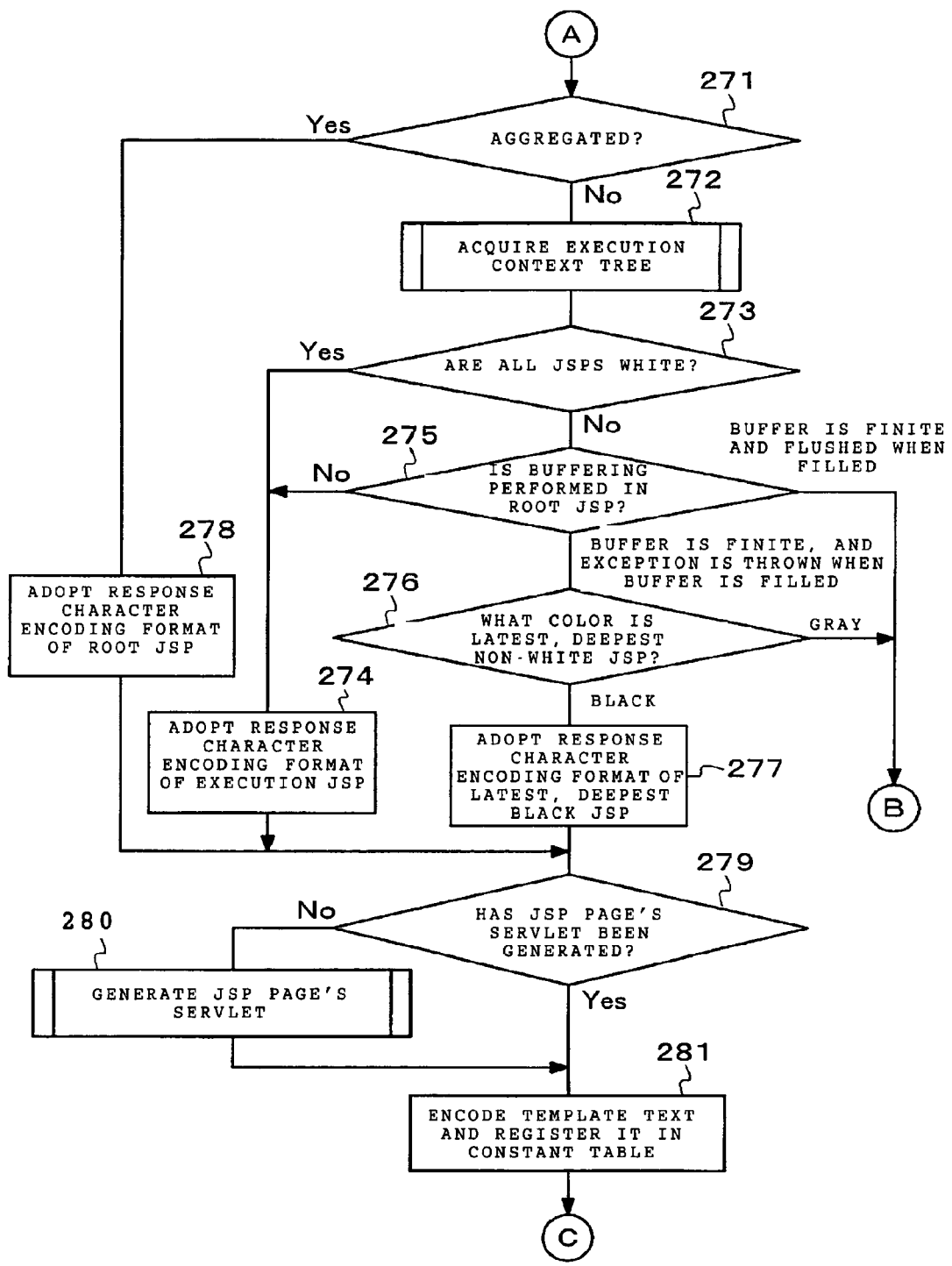
FIG. 27 is a flowchart connecting with the flowchart of FIG. 26.

FIGS. 26 and 27 show another embodiment of a process using a service method in a JSP servlet for a plurality of response character encoding formats, which process corresponds to step 96 in FIG. 9. That is, the process of FIGS. 26 and 27 is an improvement on the process of FIG. 16. The process of steps 261 to 266 in FIG. 26 is the same as that of steps 161 to 166 in FIG. 16. Improved parts are mainly shown in FIG. 27.

If it is determined that a JSP to be executed is a definite response character encoding JSP in step 263, a determination is made as to whether the JSP to be executed is aggregated and executed or whether the JSP to be executed is a root JSP in step 271. This determination may be made by flag determination described in relation to the aforementioned steps 161 and 162 in FIG. 16. Alternatively, if a run-time JSP engine as a base is Jasper, this determination may be made only by simply checking whether a response object is an org.apache-.jasper.runtime.ServletResponseWrapperInclude class, using properties of Jasper in addition.

If, in step 271, it is determined that the JSP to be executed is not to be aggregated, an execution context tree is acquired in step 272. This process will be described in detail later. Next, in step 273, a check is made as to whether all JSPs of the acquired tree are white. If all the JSPs are white, then in step 274, the response character encoding format of the root JSP is adopted as a response character encoding format to be used in the entire execution context and is saved so as to be referenced in later steps. Thereafter, the process goes to step 279.

If it is determined that not all the JSPs are white in step 273, then in step 275, a check is made as to whether buffering is performed in the JSP to be executed. If buffering is not performed, i.e. if a buffer attribute of a page directive is set to none, the process goes to step 274. On the other hand, the process goes to step 276 in the following case: buffering is performed, a buffer is finite, and an exception is thrown when the buffer is filled, i.e. an autoFlush attribute of the page directive is set to false. Meanwhile, the process goes to step 262 in the following case: buffering is performed, the buffer is finite, and the buffer is flushed when the buffer is filled. The buffer cannot be infinite in the case of JSP according to the specifications. However, if buffering is performed infinitely, the process goes to step 276.

In step 276, a tree in which JSPs called by gray JSPs are removed is created from the execution context tree, and the created tree is searched for a latest, deepest non-white JSP. That is, a JSP which is found last by starting with the root node of the tree and repeatedly following the last child node is extracted. An algorithm for this is obvious. If the relevant JSP is black, the process goes to step 277, and, if the relevant JSP is gray, the process goes to step 262. In step 277, the response character encoding format of the JSP obtained in step 276 is adopted as a response character encoding format to be used in the entire execution context and is saved similarly to the case of step 274. Thereafter, the process goes to step 279.

If, in step 271, it is determined that the JSP to be executed is to be aggregated, the response character encoding format for the execution of the root JSP, which has been set in step 274 or 277, is adopted in step 278. Specifically, nothing needs to be done. Thereafter, the process goes to step 279.

In step 279, a determination is made as to whether an optimized JSP page's servlet has already been generated. If it has been generated, the process directly goes to step 281. If an optimized JSP page's servlet has not been generated, an optimized JSP page's servlet is generated in step 280, and then the process goes to step 281. The procedure for generating a servlet in step 280 is different from that in the case of FIG. 3. This generation procedure will be described later.

In step 281, if template text is not encoded using the response character encoding format adopted in the aforementioned step 274, 277, or 278, the template text is encoded into a byte array using the relevant response character encoding format and registered in the constant table to be related to the relevant response character encoding format. Thereafter, in step 266, the JSP page's servlet generated in step 280 is executed. At that time, the byte array in the constant table, which is related to the response character encoding format adopted for the relevant JSP in the aforementioned step 274, 277, or 278, is used.

FIG. 28 shows an appropriate table as a constant table which is created or updated in step 281 and which is used by the optimized JSP page's servlet created in step 280. The adopted response character encoding format is stored in a region which can be referenced by the optimized JSP page's servlet, thus making it possible to decide the column of the constant table which is referenced by an out.write statement.

Figure 29:
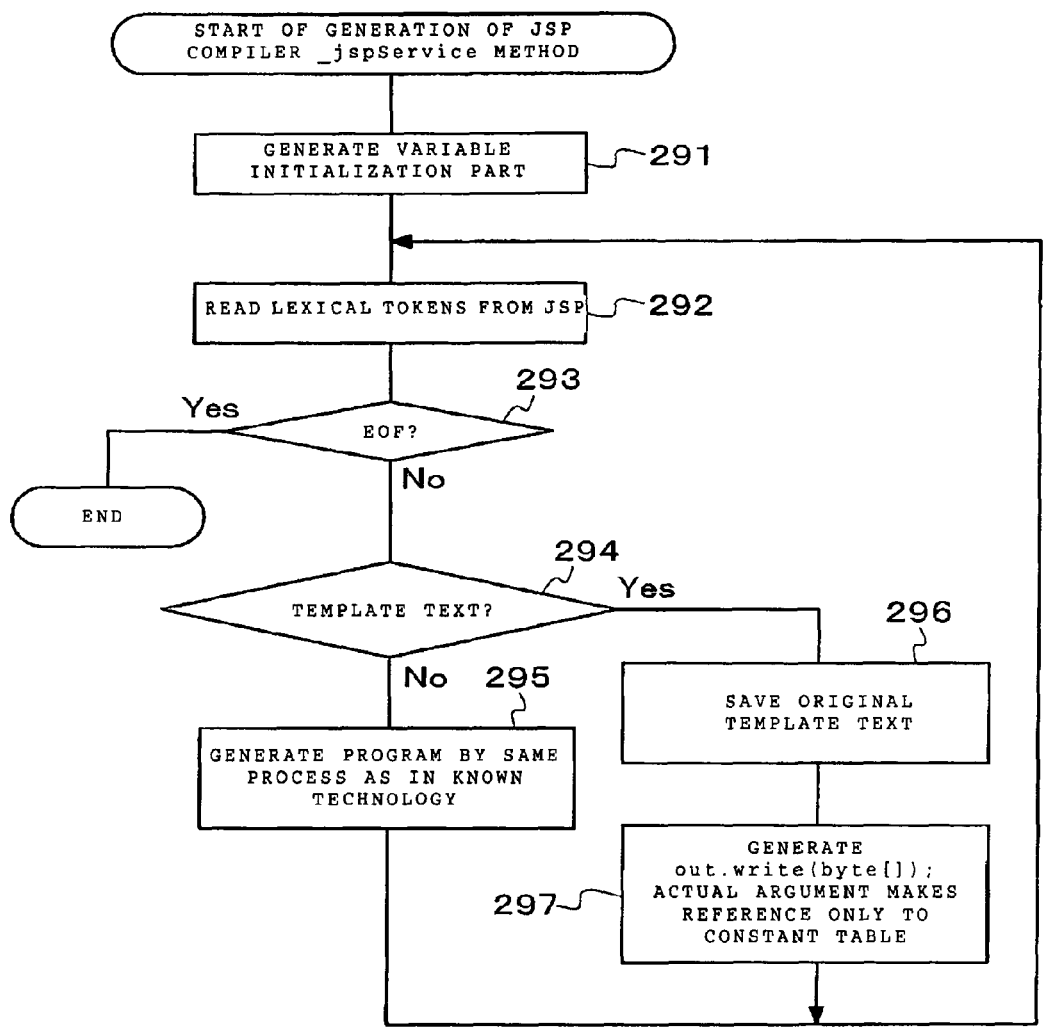
FIG. 29 is a flowchart showing a process for generating a JSP servlet in FIG. 27.

FIG. 29 shows the process of step 280 in FIG. 27. In this process, an optimized JSP page's servlet for a JSP in which the response character encoding format is not definite, i.e. an indefinite response character encoding JSP, is generated. In this generation process, a part for generating a _jspService method is different from that in the case of the generation (step 265 in FIG. 26) of a JSP page's servlet for a definite response character encoding JSP. The process of steps 291 to 295 in FIG. 29 is the same as that of steps 31 to 35 in FIG. 3.

If it is determined that lexical tokens read from the JSP are template text in step 294, then in step 296, a new row or column is added to a constant table as shown in FIG. 28, and the template text is registered therein. This template text will be transformed into a byte array later in step 281 of FIG. 27, and the result of the transform should be registered in the constant table. Next, in step 297, a part corresponding to an out.write(byte[ ]) method is generated. At that time, the relevant part is configured so that a row or column of the constant table can be referenced.

The aforementioned execution context tree acquisition process (step 272 in FIG. 27) will be described. Although there are various conceivable methods of creating an execution context tree, the following simplest method is adopted here. When a DG (directed graph) has been created (step 104 in FIG. 10) in the JSP servlet initialization process (step 91) in FIG. 9 before the execution context tree acquisition process, an attribute of order has already been given to each edge. Accordingly, in the execution context tree acquisition process, one JSP to be executed is selected from the DG, and a subgraph as a component accessible from the one JSP is extracted. Since there should be no cycle in a DG created from a Web application which operates correctly, this subgraph should be a directed acyclic graph (DAG) in general. In the case where this DAG is not a tree but there is a JSP having a plurality of incoming edges, a tree is created by copying a clause corresponding to the relevant JSP. Finally, the order relations between clauses of the tree are sorted in order of edges of the DG.

Figure 30:
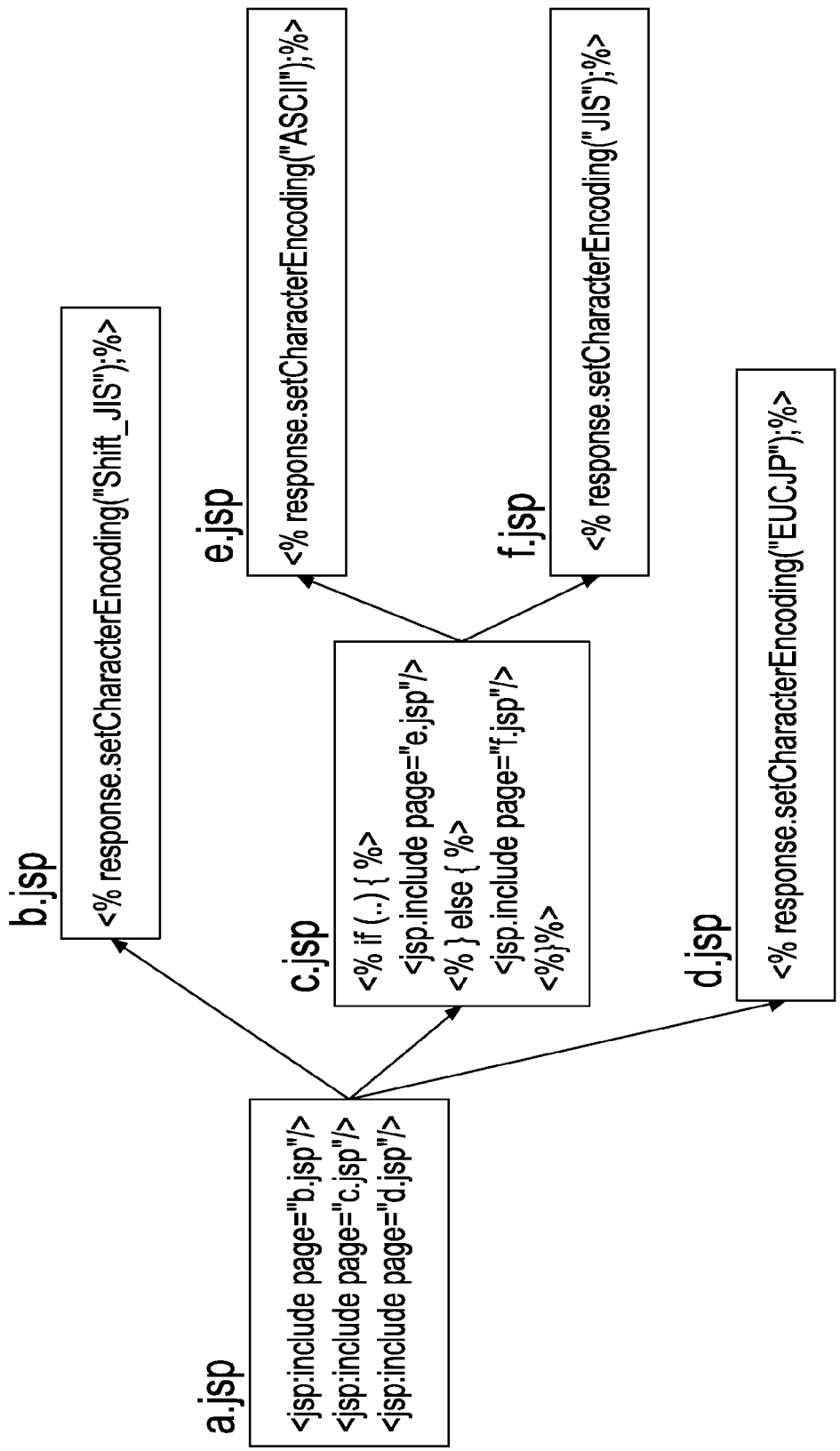
FIG. 30 is a view showing one example of a tree in the case where a root is at the left and where the order in which columns of an aggregated JSP are called is in the direction from top to bottom.

FIG. 30 shows one example of a tree for the case where a root is at the left and where the order in which columns of an aggregated JSP are called is in the direction from top to bottom. In this case, when a response character encoding format is derived in step 276 of FIG. 27, e.jsp and f.jsp are called by c.jsp, which is a gray JSP, and therefore are ignored. In this case, d.jsp becomes a latest and deepest JSP.

A specific example for the case where the response character encoding format changes due to aggregation relationships at the time of execution will be described. A description will be made taking as an example three JSPs of a.jsp, b.jsp, and c.jsp as shown in FIGS. 20 to 22. In this case, response character encoding formats differ between the case where a.jsp is executed and the case where b.jsp is executed. Further, response character encoding format to be used for c.jsp is not revealed until it is decided which of a.jsp and b.jsp aggregates c.jsp at the time of execution.

Figure 23:
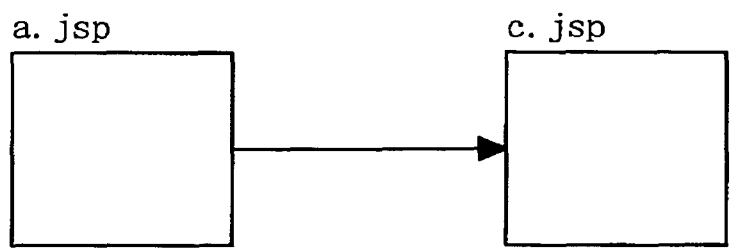
FIG. 23 is a diagram showing one of two execute context trees created by classifying the three JSPs of FIGS. 20 to 22 into any of three colors.
Figure 24:
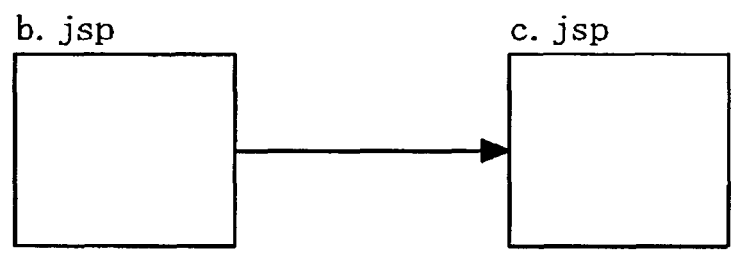
FIG. 24 is a diagram showing the other one of the two execute context trees created by classifying the three JSPs of FIGS. 20 to 22 into any of the three colors.

Accordingly, in order to decide this response character encoding format, the three JSPs are classified into any of three colors, and execution context trees are created (step 272 in FIG. 27). The execution context trees become as shown in FIGS. 23 and 24, respectively. Since all JSPs are white in both of these trees, a response character encoding format to be used in the entire execution context comes to be the response character encoding format of the root, i.e. Shift_JIS in the case where the root is a.jsp, or EUCJP in the case where the root is b.jsp.

FIG. 25 shows one example of a servlet which can generate a response in both the case where c.jsp. is called by a.jsp and the case where c.jsp is called by b.jsp. In a _jspService method, in a part 251, responseEncoding indicating a response character encoding format is acquired, and an index responseEncodingIndex corresponding to this is acquired. Further, in a part 252, using responseEncoding, a byte sequence expressed using the encoding format corresponding to responseEncodingIndex in template_text_constant_pool is set to be outputted to a buffer. Thus, it is possible to output a byte sequence expressed using Shift_JIS in the case where c.jsp has been called by a.jsp, or using EUCJP in the case where c.jsp has been called by b.jsp.

Next, an embodiment in which the adaptation to internationalized JSP is made will be described. In a JSP which can generate a response document by selecting an appropriate message character string depending on a language selected by a client (hereinafter referred to as "internationalized JSP"), a part for generating a massage character string is not template text, unlike an ordinary JSP. Many internationalized JSPs use an internationalization tag library based on specifications of JSP Standard Tag Library (JSTL) or the like.

For example, in order to generate, using the same JSP, HTML documents which have the same effect but of which display languages are respectively English and Japanese as shown in FIGS. 31A an 31B, a JSP as shown in FIG. 32 and language resources as shown in FIGS. 33A and 33B are necessary in the case where JSTL internationalization tags are used. Even if the method of each aforementioned embodiment is directly applied to such an internationalized JSP, efficiency cannot be improved because the proportion of template text is small.

On the other hand, in the case of a JSP in which internationalization tags are used, the execution speed at which a message is generated using internationalization tags is overwhelmingly slow compared to the case of template text. In this connection, there is an existing technology having the following feature: efficiency is improved by transforming a JSP, in which internationalization tags are used, into a localized JSP, in which internationalization tag parts are expanded into template text depending on a client-selected language at the time of execution.

Figures 34, 35:
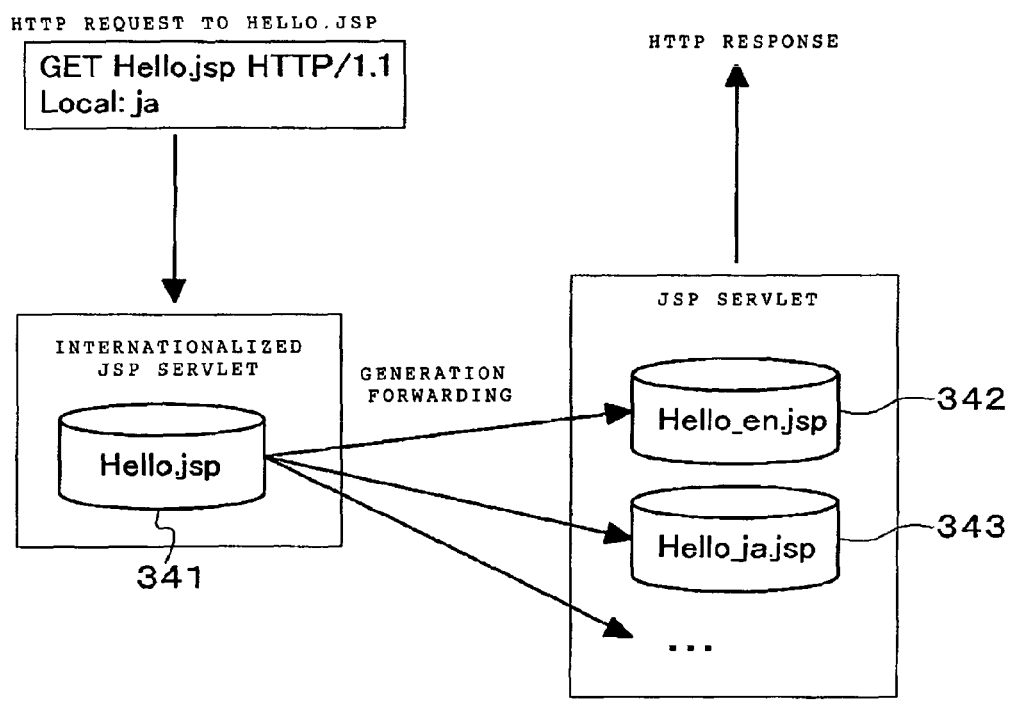
FIG. 34 is a diagram showing a process in an existing technology in which the efficiency of the execution of a JSP using internationalization tags is improved.

FIG. 34 shows a process in this existing technology. For example, in the case where an internationalized JSP 341 (hello.jsp) as shown in FIG. 32 has been requested, a JSP 342 (hello_en.jsp) or 343 (hello_ja.jsp) localized into English or Japanese as shown in FIG. 35A or 35B is generated depending on a client-selected language, and the internationalized JSP is made to be forwarded to it. In the localized JSPs 342 and 343, the proportion of template text is considerably increased by an amount corresponding to the absence of internationalization tags.

In the present embodiment, this localized JSP generation technology is combined with the technology of each aforementioned embodiment, whereby the speed at which a Web page is generated is improved even for internationalized JSPs. Specifically, a JSP compiler and an output stream for performing the response character encoding omission of the embodiment on the localized JSPs 342 and 343 are adopted. The process performed on the localized JSPs is completely the same as that performed on uninternationalized ordinary JSPs.

Incidentally, the present invention is not limited to the aforementioned embodiments but can be carried out by appropriately modifying the aforementioned embodiments. For example, in the above, a JSP page's servlet is started by a JSP servlet. Instead, the following may be adopted: a user himself/herself manually performs steps 91 and 94 in FIG. 9 and step 152 in FIG. 15 before application deployment, a JSP is thereby compiled into a JSP page's servlet in advance, and the servlet container directly starts the JSP page's servlet.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system or in a distributed fashion, where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A device for generating a dynamic content creation program by expressing text in a predetermined character encoding format, said device comprising:
   an input/output interface receiving a request for a file comprising dynamic content and static text, wherein the static text is described by character code information in a character encoding format applicable to its content;
   a primary storage device storing computer executable instructions, said computer executable instructions causing a computer to perform:
   determining whether the character code information can be prepared in advance of execution of the dynamic content creation program, comprising:
      determining that the character encoding format for the content is present; determination that the character encoding format for the content in the file is definite; and
      determining that the file does not contain an instruction to change the character encoding format for the content;
   when it is determined that the character code information can be prepared in advance, preparing the character code information in advance such that the dynamic content creation program utilizes the character code information at execution time to output a static text portion of the file without having to encode said static text portion when the dynamic content is generated by executing the dynamic content creation program;
   classifying a plurality of files having an aggregation relationship into a first type which does not contain an instruction to change the character encoding format for the content, a second type which contains an instruction to change the character encoding format for the content to a definite one, and a third type other than the first and second types;
   making a positive determination for the files when all of said files having the aggregation relationship belong to the first type and the character encoding formats for the contents are identical in all of the files; and
   wherein preparing the character code information in advance comprises:
      making a determination for each of the plurality of files having the aggregation relationship as to whether the character code information is one generated by encoding an expression of the static text in said character encoding format into an expression at time of execution of said dynamic content creation program generated from said file; and
      wherein among said plurality of files having said aggregation relationship, acquiring an execution context tree in which an unaggregated file is a root of said tree;
   wherein for all files belonging to the first type, said character encoding format for the content concerning the file of the root is adopted for all the files belonging to the tree; and
   wherein for the tree satisfying all conditions that all the files of the tree do not belong to the first type, and the program based on the file of the root performs buffering of finite size in relation to output for generating the content and throws an exception when a buffer has been filled, and after the file called by the file of the third type has been removed, the latest and deepest file belongs to the second type, the character encoding format for the content of the latest and deepest file is adopted for all the files belonging to the tree; and
   a processor device operably coupled with the primary storage device for executing the computer executable instructions.

2. The device of claim 1 wherein the file is a web page.

3. The device of claim 1, wherein the computer-executable instructions further comprise:
   generating a graph showing the aggregation relationship by using each of the plurality of files not having the aggregation relationship of the first type with the character encoding format for the content identical in all of the plurality of the files;
   finding a connection component in the graph; and
   making a positive determination for each file belonging to the first type and in which the character encoding formats for the contents are identical.

4. The device of claim 3 wherein preparing the character code information in advance takes into account an execution context of each of the respective programs generated from the plurality of files having the aggregation relationship, and prepares said character code information concerning the static text for each character encoding format for the content, which has a possibility of being adopted at time of execution, for the program in which the character encoding format that is adopted for said content changes depending on execution content.

5. The device of claim 1, wherein the character code information is prepared by directly using the static text in the file when the encoding format in the file concerning the static text is identical to that in the content.

6. A computer program storage product comprising a non-transitory computer readable medium having computer executable instructions therein for causing a computer to generate a dynamic content creation program by expressing text in a predetermined character encoding format by:

receiving a request for a file comprising dynamic content and static text, wherein the static text is described by character code information in a character encoding format applicable to its content;

determining whether the character code information can be prepared in advance of execution of the dynamic content creation program, comprising:

determining that the character encoding format for the content is present; determination that the character encoding format for the content in the file is definite;

determining that the file does not contain an instruction to change the character encoding format for the content; and when it is determined that the character code information can be prepared in advance, preparing the character code information in advance such that the dynamic content creation program utilizes the character code information at execution time to output a static text portion of the file without having to encode said static text portion when the dynamic content is generated by executing the dynamic content creation program;

classifying a plurality of files having an aggregation relationship into a first type which does not contain an instruction to change the character encoding format for the content, a second type which contains an instruction to change the character encoding format for the content to a definite one, and a third type other than the first and second types;

making a positive determination for the files when all of said files having the aggregation relationship belong to the first type and the character encoding formats for the contents are identical in all of the files; and wherein preparing the character code information in advance comprises:

making a determination for each of the plurality of files having the aggregation relationship as to whether the character code information is one generated by encoding an expression of the static text in said character encoding format into an expression at time of execution of said dynamic content creation program generated from said file; and wherein among said plurality of files having said aggregation relationship, acquiring an execution context tree in which an unaggregated file is a root of said tree;

wherein for all files belonging to the first type, said character encoding format for the content concerning the file of the root is adopted for all the files belonging to the tree; and wherein for the tree satisfying all conditions that all the files of the tree do not belong to the first type, and the program based on the file of the root performs buffering of finite size in relation to output for generating the content and throws an exception when a buffer has been filled, and after the file called by the file of the third type has been removed, the latest and deepest file belongs to the second type, the character encoding format for the content of the latest and deepest file is adopted for all the files belonging to the tree.

7. The computer program storage product of claim 6 wherein the file is a web page.

8. A method for generating a dynamic content creation program, comprising steps of:

using an input/output interface receiving a request for a file comprising dynamic content and static text, wherein the static text is described by character code information in a character encoding format applicable to its content;

using a primary storage device storing computer executable instructions, said computer executable instructions causing a computer to perform:

determining whether the character code information can be prepared in advance of execution of the dynamic content creation program, comprising:

determining that the character encoding format for the content is present; determination that the character encoding format for the content in the file is definite; and determining that the file does not contain an instruction to change the character encoding format for the content;

when it is determined that the character code information can be prepared in advance, preparing the character code information in advance such that the dynamic content creation program utilizes the character code information at execution time to output a static text portion of the file without having to encode said static text portion when the dynamic content is generated by executing the dynamic content creation program;

classifying a plurality of files having an aggregation relationship into a first type which does not contain an instruction to change the character encoding format for the content, a second type which contains an instruction to change the character encoding format for the content to a definite one, and a third type other than the first and second types;

making a positive determination for the files when all of said files having the aggregation relationship belong to the first type and the character encoding formats for the contents are identical in all of the files; and wherein preparing the character code information in advance comprises:

taking into account an execution context of each of the respective programs generated from the plurality of files having the aggregation relationship, and prepares said character code information concerning the static text for each character encoding format for the content, which has a possibility of being adopted at time of execution, for the program in which the character encoding format that is adopted for said content changes depending on execution content;

making a determination as to whether each of the plurality of files having the aggregation relationship is a definite file in which the character encoding format can be uniquely decided; and making a determination for each of the plurality of files having the aggregation relationship as to whether the character code information is one generated by encoding an expression of the static text in said character encoding format into an expression at time of execution of said dynamic content creation program generated from said file; and wherein among said plurality of files having said aggregation relationship, acquiring an execution context tree in which an unaggregated file is a root of said tree;

wherein for all files belonging to the first type, said character encoding format for the content concerning the file of the root is adopted for all the files belonging to the tree; and wherein for the tree satisfying all conditions that all the files of the tree do not belong to the first type, and the program based on the file of the root performs buffering of finite size in relation to output for generating the content and throws an exception when a buffer has been filled, and after the file called by the file of the third type has been removed, the latest and deepest file belongs to the second type, the character encoding format for the content of the latest and deepest file is adopted for all the files belonging to the tree; and using a processor device operably coupled with the primary storage device for executing the computer executable instructions.

9. The method of claim 8 wherein the file is a web page.

* * * * *